United States Patent [19]

Anderson

[11] Patent Number: 5,134,884

[45] Date of Patent: * Aug. 4, 1992

[54] SINGLE PULSE IMAGING DEVICE

[76] Inventor: Forrest Anderson, P.O. Box 1400, Bernalillo, N. Mex. 87004

[*] Notice: The portion of the term of this patent subsequent to Aug. 25, 2004 has been disclaimed.

[21] Appl. No.: 106,577

[22] Filed: Oct. 7, 1987

Related U.S. Application Data

[63] Continuation-in-part of Ser. No. 858,696, May 2, 1986, Pat. No. 4,706,499.

[51] Int. Cl.$^5$ ............................................. G01N 29/04
[52] U.S. Cl. ..................................................... 73/625
[58] Field of Search ................. 73/625, 626, 603, 606, 73/628, 597; 128/660, 660.01-660.1, 661.01-661.1, 662.01-662.06, 663.01; 367/14, 58, 117, 69, 72; 378/70, 86, 87; 250/308, 369, 370.09; 342/179

[56] References Cited

U.S. PATENT DOCUMENTS

| | | |
|---|---|---|
| Re. 30,397 | 9/1980 | King . |
| 3,353,151 | 11/1967 | Rockwell . |
| 3,676,584 | 7/1972 | Plakas . |
| 3,717,843 | 2/1973 | Farrah et al. . |
| 3,918,025 | 11/1975 | Koskikawa et al. . |
| 4,023,175 | 5/1977 | Brown et al. .......................... 367/113 |
| 4,074,564 | 2/1978 | Anderson ................................ 73/596 |
| 4,119,939 | 10/1978 | Katakura ................................ 367/113 |
| 4,131,022 | 12/1978 | Mezerich . |
| 4,208,731 | 6/1980 | Desbrandes ............................ 367/90 |
| 4,325,257 | 4/1982 | Kino et al. .............................. 73/626 |
| 4,332,016 | 5/1982 | Berntsen . |
| 4,351,035 | 9/1982 | Buchanan et al. ..................... 367/14 |
| 4,395,909 | 8/1983 | Stienberg et al. . |
| 4,706,499 | 11/1987 | Anderson ............................... 73/625 |

OTHER PUBLICATIONS

D. K. Mak "Ultrasonic Reflection Tomography with a Transmitter-Receiver System" Acoustical Imaging vol. 15 1987.
Miller, Dec. 1983, "Integral Transforms and the Migration of Multiple Offset Borehole Seismic Profiles".
Wiggins, Aug. 1984, "Kirchoff Integral Extrapolation and Migration of Non Planar Data".
Tarantola, Aug. 1984, "Inversion of Seismic Reflection Data in the Acoustic Approximation".
Tarantola, 1984, "Linearized Inversion of Seismic Reflection Data".
Schneider, Feb. 1978, "Integral Formulation for Migration in Two and Three Dimensions".
Schneider, Dec. 1971 "Developments in Seismic Data Processing and Analysis (1968-1970)".
French, Jun. 1974 "Computer Migration of Oblique Seismic Reflection Profiles".
Gardner, Dec. 1974, "Elements of Migration and Velocity Analysis".
French, Jun. 1974, "Two Dimensional and Three Dimensional Migration . . . ".
Lindsey, Feb. 1970, "Digital Migration".
Rockwell, Apr. 1971, "Migration Stack Aids Interpretation".
Carrion, 1987, "Inverse Problems and Tomography in Acoustics and Seismology".
Nolet, 1987, "Seismic Tomography".
Norton, Mar. 1980, "Reconstruction of a Reflectivity Field from Line Integrals . . . ".

Primary Examiner—Hezron E. Williams
Assistant Examiner—Louis M. Arana

[57] ABSTRACT

A method and device for imaging three dimensions with a single pulse of energy is described. An embodiment is disclosed which uses a single monopolar transmitted pulse which radiates through a wide solid angular volume. Echoes caused by objects in this volume are detected by a large diameter, sparse circular array of receiver elements. The time history of each element is stored in a digital memory. A reconstruction processor uses this stored time history to reconstruct an image of the reflecting objects. A simple time of flight algorithm, based on Huygens principle, is used in the reconstruction. The algorithm automatically takes into account transmitted wave front curvature and makes no approximations such as fresnel or fraunhofer in the reconstruction. A circular array of receiver elements can be used, which is axicon, and is focused throughout the imaged volume. A perspective processor controls the reconstruction processor such that the volumetric image may be viewed from various perspectives. Tomographic images may be selected from the imaged volume at various positions and orientations. The perspective processor controls the reconstruction process such that the reconstructed points may be accumulated, summed and thus integrated so that a three dimensional volume may be viewed on a two dimensional display.

25 Claims, 14 Drawing Sheets

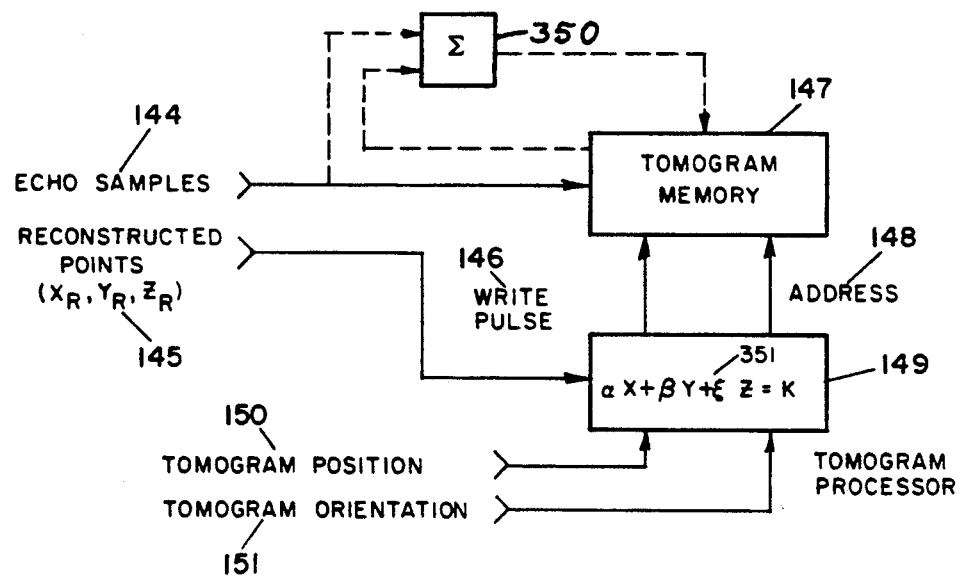
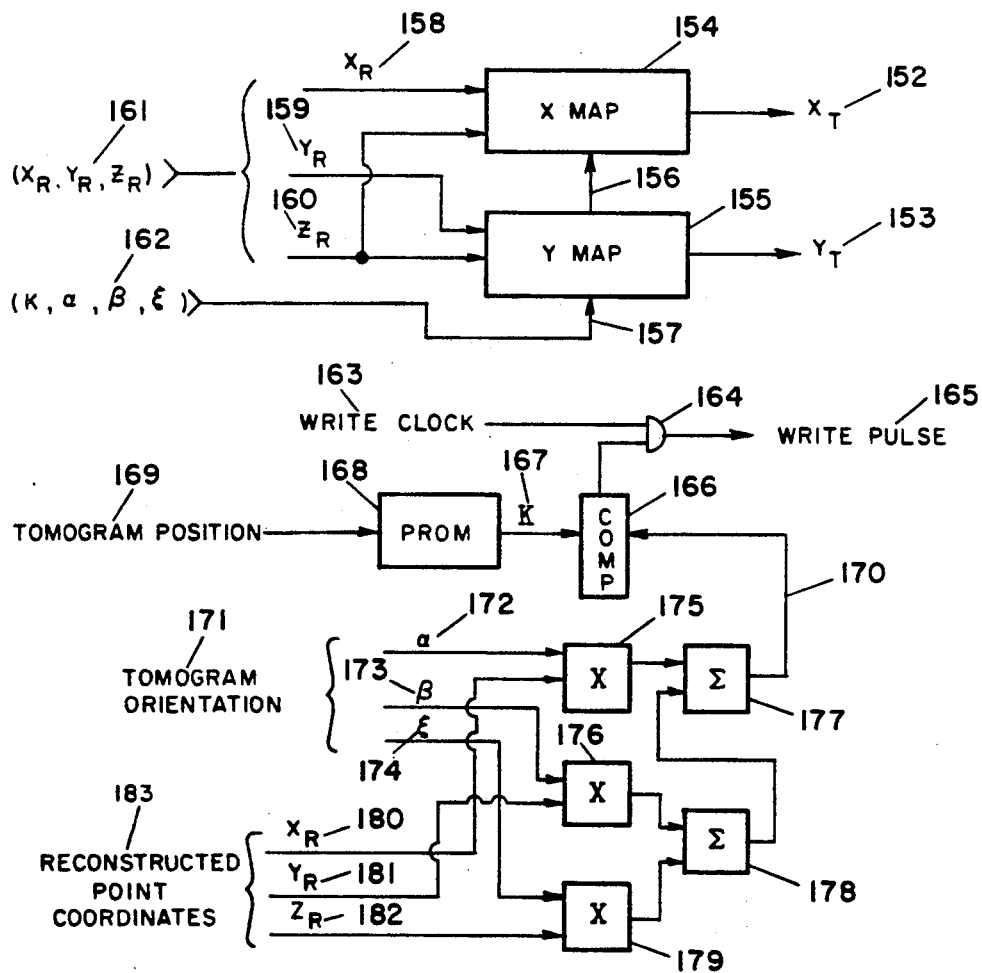
FIG—8

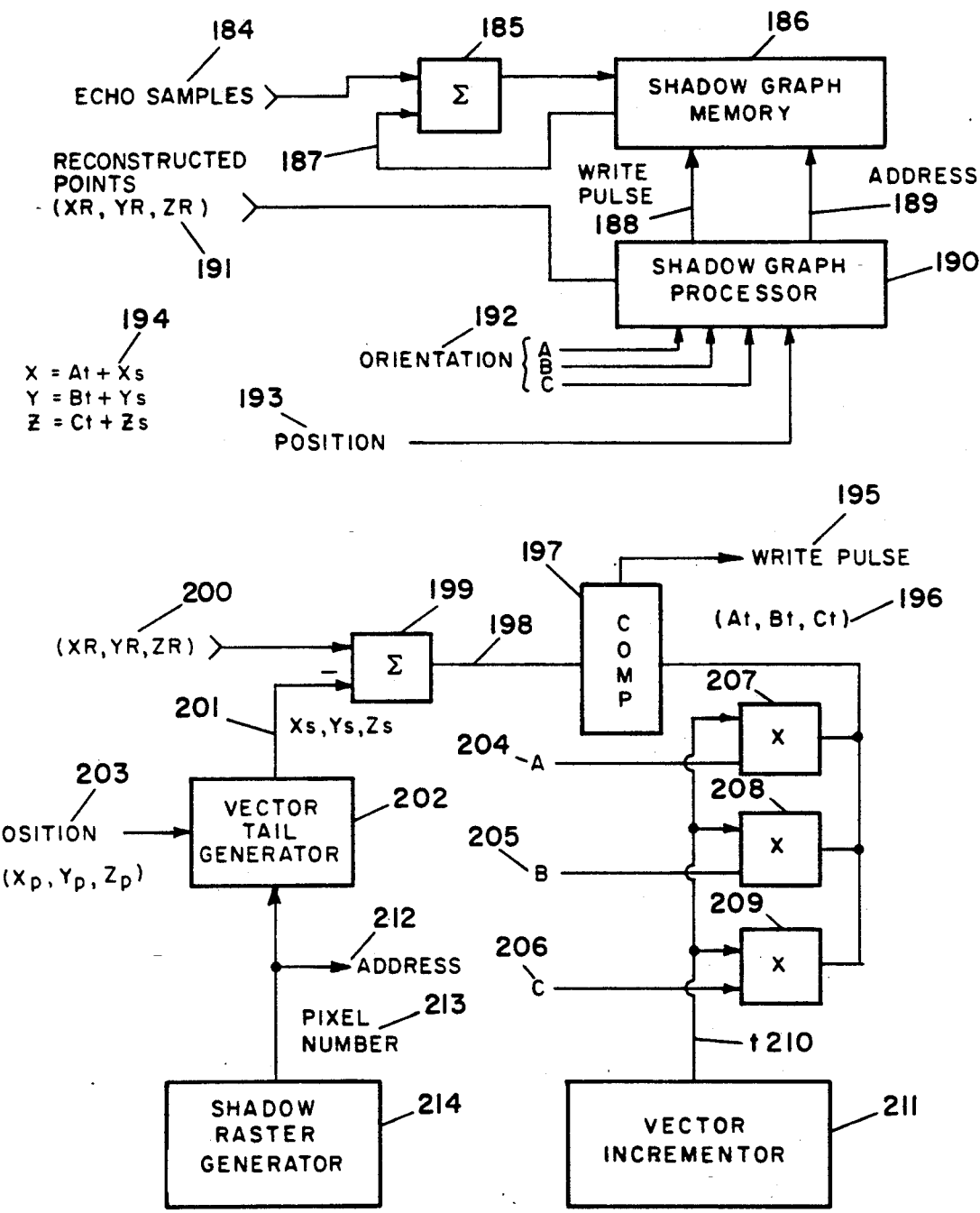
FIG—9

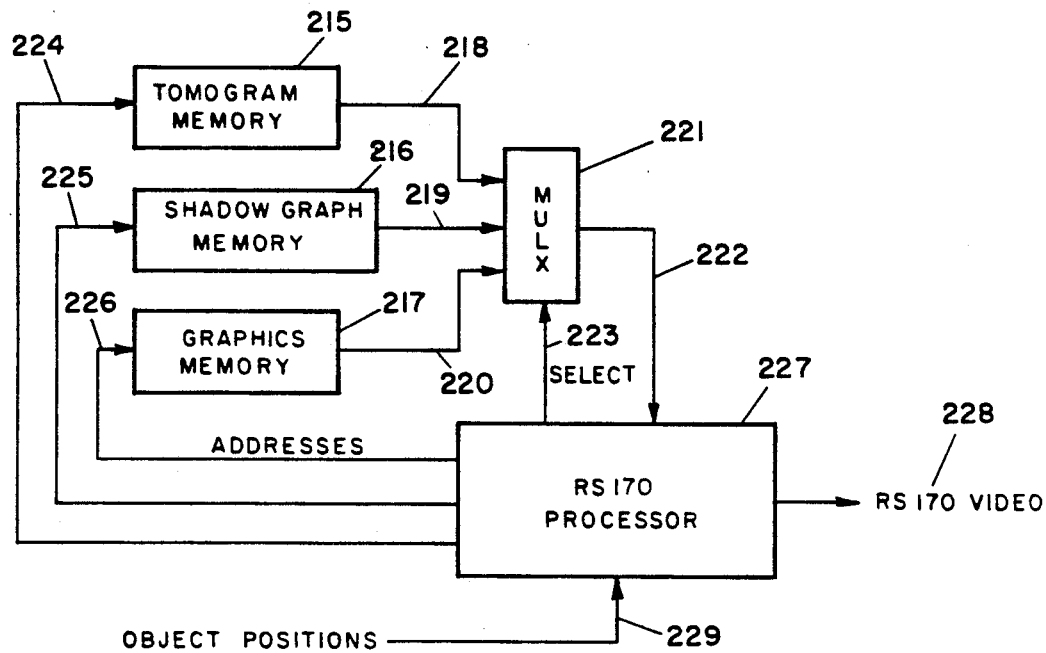
FIG—10
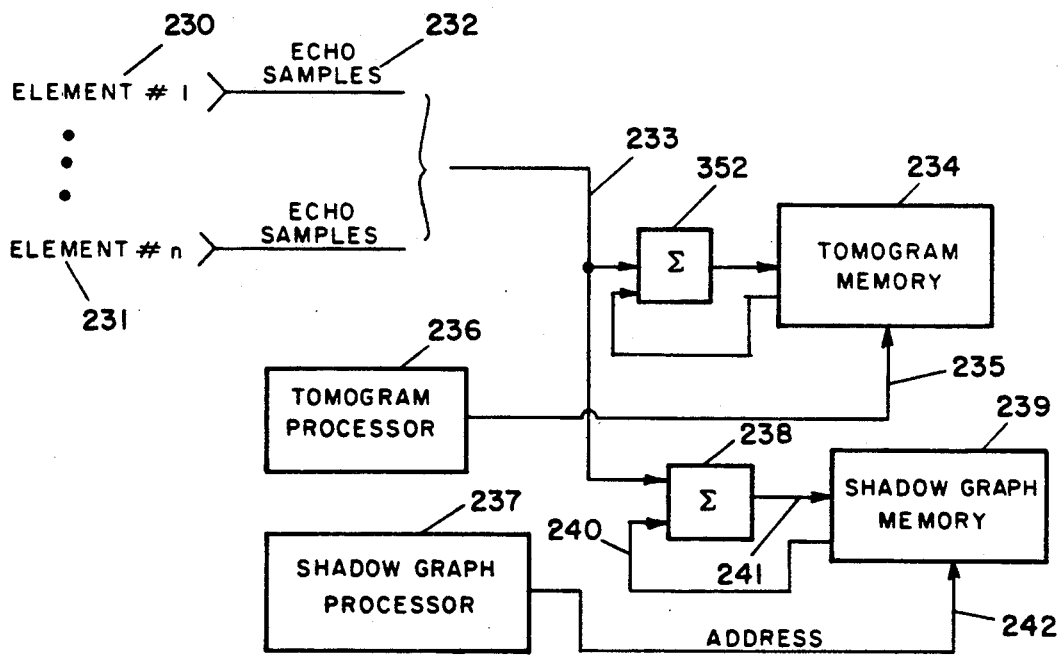
FIG—11

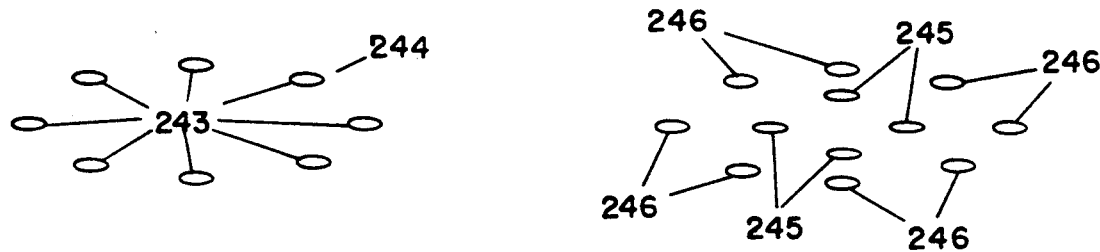
FIG — 12
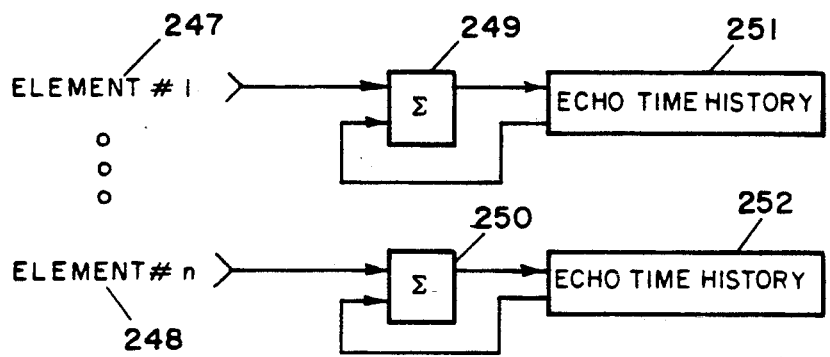
FIG — 13
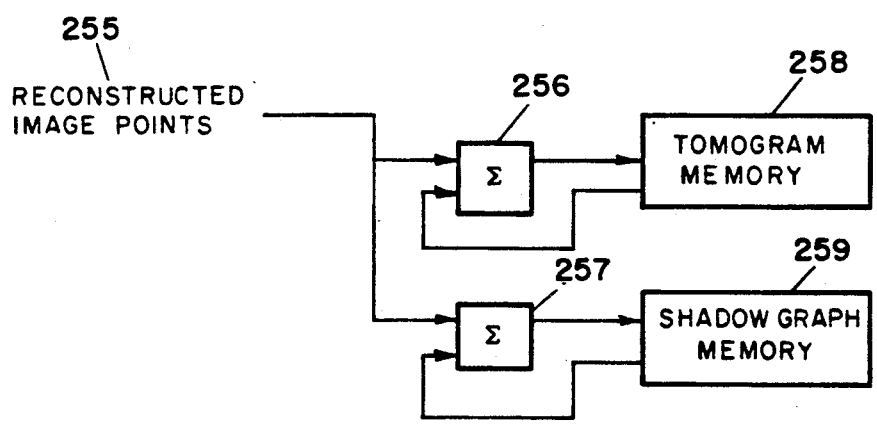
FIG — 14

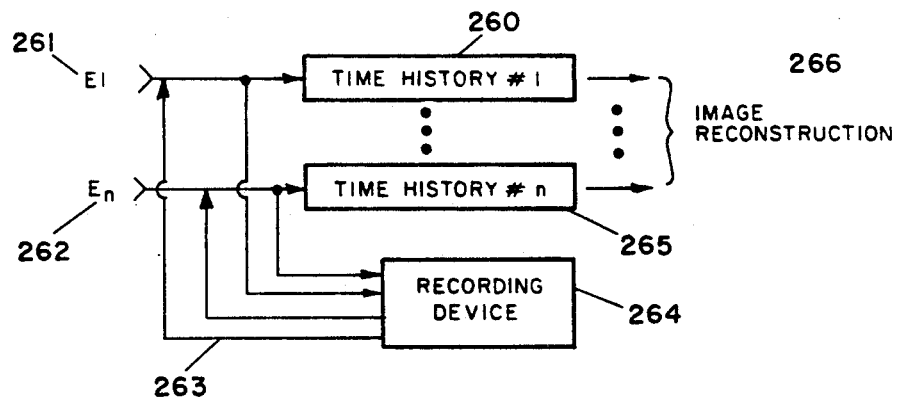
FIG—15
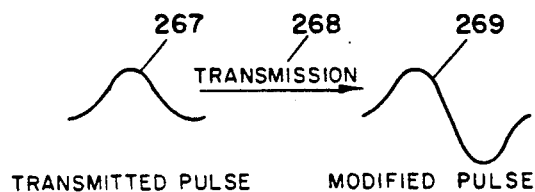
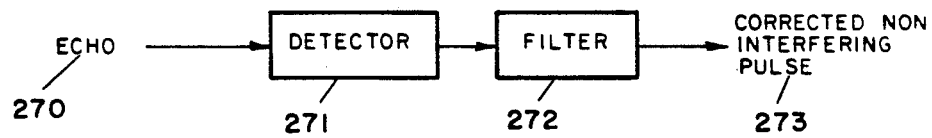
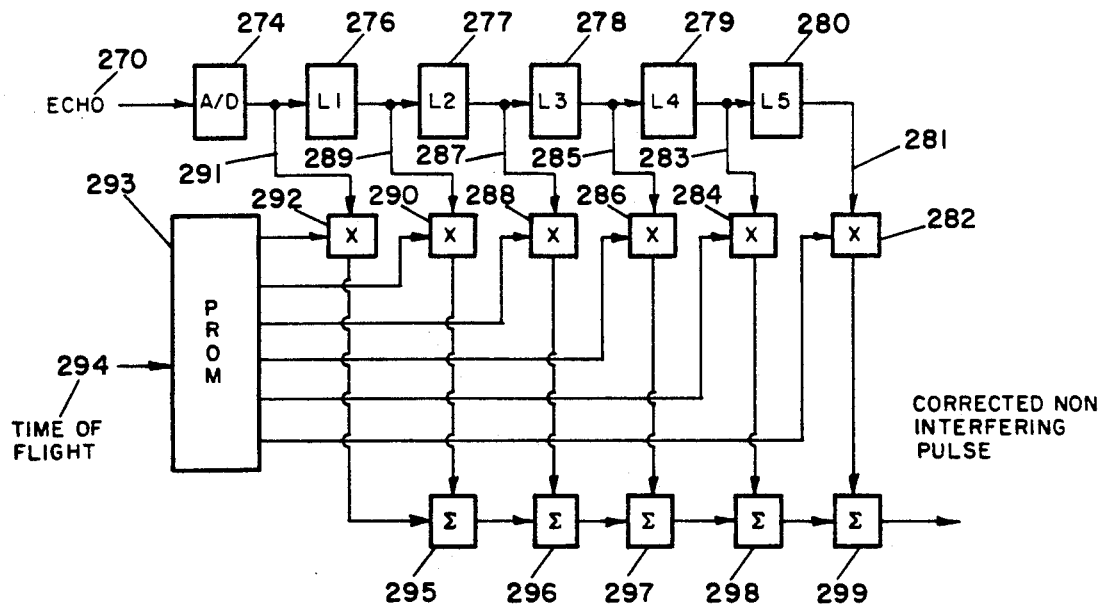
FIG—16

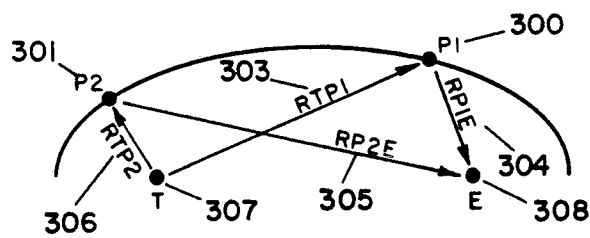
FIG—17
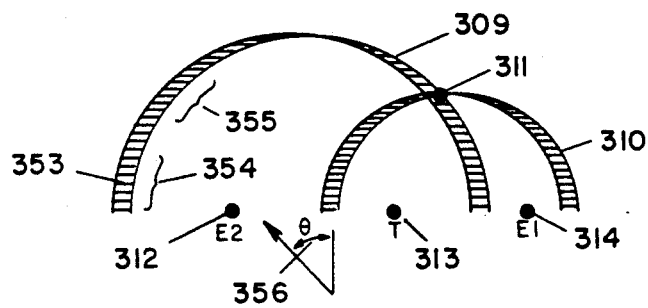
FIG—18
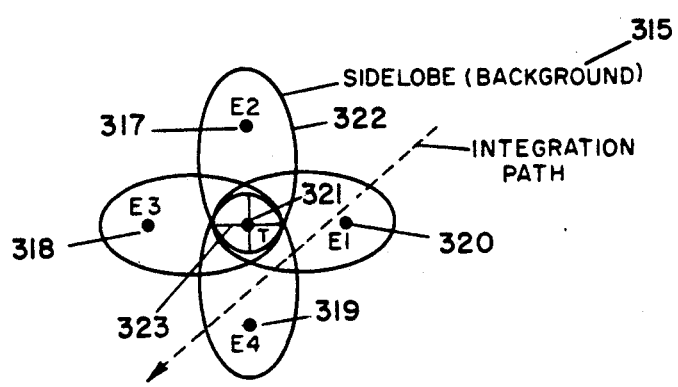
FIG—19
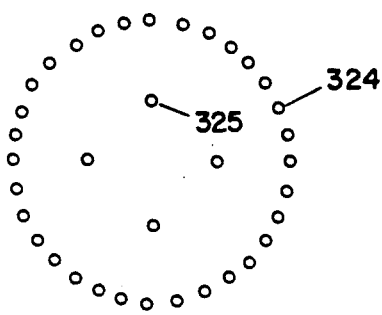
FIG—20

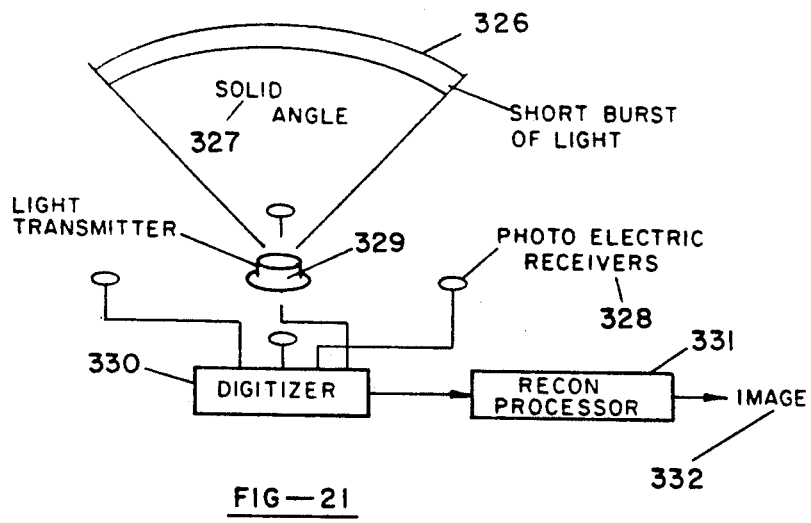
FIG—21
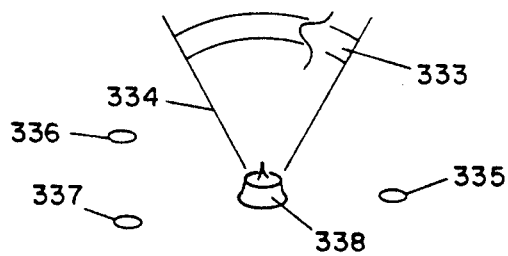
FIG—22
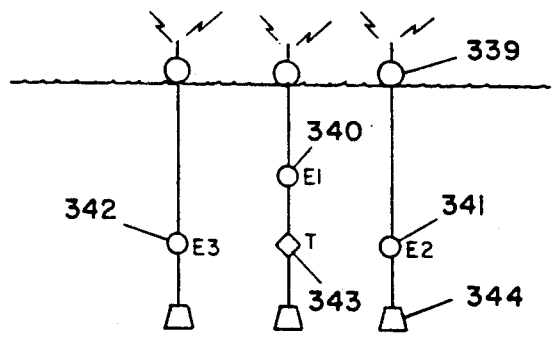
FIG—23
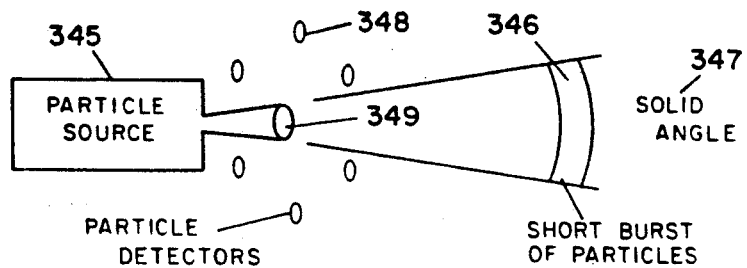
FIG—24

SINGLE PULSE IMAGING DEVICE

CROSS REFERENCES TO RELATED APPLICATIONS

This application is a continuation in part of U.S. Pat. No. 4,706,499 filed May. 2, 1986 and is related to U.S. Pat. No. 4,688,430 which is incorporated by reference.

BACKGROUND OF THE INVENTION

1. Field of the Invention

This invention relates to the three dimensional imaging of objects using a single pulse of energy.

2. Description of the Prior Art

A previous U.S. Pat. No. 4,688,430, describes a similar machine. However in that application the reconstruction process was carried out in two geometrical steps. In the first step the image was resolved with respect to each of two angular directions originating at the transmitting transducer. In the second step the ranges along each two dimensional angular direction are resolved. This required a complicated mathematical algorithm to be implemented in the reconstruction hardware, and in addition, mathematical approximations to the wavefield geometry may be required.

The previous patent essentially uses spherical coordinates originating at the center of the transmitting transducer. This yields a lateral resolution that is very small near the transducer but grows larger as the distance from the transducer increases. However, a large aperture formed by a sparse array is capable of producing relatively uniform resolution for ranges equal to several diameters of the array. The previous patent shows an intermediate memory called the data memory which is used to store the three dimensional reconstructed field of reflecting objects. This is an intermediate memory since it must be further processed into a tomographic image or a two dimensional view through a three dimensional field of objects. The present invention can reconstruct tomograms or two dimensional views through three dimensional fields directly from the stored time history of the receiver elements. This increase the processing speed and reduces the amount of electronics by eliminating the requirements for an intermediate memory.

The final display will most likely be in rectangular coordinates whereas the previous approach reconstructs in spherical coordinates. This results in complex electronics being required in the implementation of the machine.

The transmitted wavefield from a small transducer emitting a pulse will approximate an expanding sphere at locations several diameters away from the transducer. This must be taken into account by the reconstruction processor or image degradation will occur. The previous approach makes no explicit provision for this and it would be hard to implement in such a two step reconstruction technique. The implementation would require look up tables or computation circuits for each reconstruction point and each receiver element. This would be hard to implement in real time and would use a large amount of electronics.

The present invention uses a round trip time of flight algorithm which automatically takes into account the curved nature of the wavefront propagating away from the transmitter. In addition no Frauhofer or Fresnel approximations are made since the algorithm is essentially a Huygens wavelet based approach. It requires only the computation of the distance from the transmitter to the reconstruction point and computation of the distance from the reconstruction point to each receiver element.

The parent application describes an improved imaging technique whereby the foregoing disadvantages are overcome. However, there are further improvement that can be made.

The time history memories can be eliminated by a reconstruction techniques that immediately sums or combines echo samples as they are sampled into the appropriate reconstruction locations (or voxels) in the 3D memory containing the reconstructed three dimensional image.

The 3D memory can be eliminated by combining the echo samples as they are sampled into the appropriate pixels in the tomographic image and the shadowgraph image. (The shadowgraph image is the 3memory data integrated along a specified viewing perpective vector to provide a two dimensional view through a three dimensional volume)

Multiple redundant transmitted pulses may be used to reconstruct a single image whereby the image signal to noise ratio is improved. The term "redundant" is used since only one transmitted pulse is necessary for the reconstruction of a three dimensional image.

Multiple transmitters may be used with the redundant transmitted pulses to reduce the sidelobe levels. These transmitters are to be spatially offset from one another. The receiver elements may be used as the multiple transmitters or separate transmitting elements may be used. The echoes from the multiple transmitters may be summed in time history memories or separate images may be reconstructed from each different transmitters echoes and the resulting images combined or summed. The later may be done in the absence of time history memories.

Recording devices may be added to record the echo time histories from a number of sequential transmitted pulses, at a later time the recording then can be played back though the machine allowing image reconstruction to take place. The resulting "real time" 3D image can be viewed from various viewing perspectives and tomograms may be extracted from various positions and orientations.

If oscillations occur in the transmitted pulse, the image will be degraded. Several techniques may be used to compensate for or accomodate this.

The reconstruction technique described in U.S. Pat. No. 4,706,499 is essentially the backprojection of the echo samples over ellipsoids of revolution as will be more fully described in this application. The backprojections may be weighted as a function of the reconstruction point position to compensate for transmitter or receiver radiation patterns and other phenomena.

The sparse receiver array, by the addition of elements, may be made into a more nearly continous array which when arranged in a circle would be a phased annulus or adjustable axicon. This sort of receiver array normally has very high sidelobes but when used with a noninterfering transmitted pulse has acceptable sidelobe levels. The addition of redundant pulsing and multiple transmitters further reduces the sidelobe level.

In forming shadowgraphs by integration (two dimensional views through three dimensional volumes), the sidelobes are integrated and the relative sidelobe level is degraded. After a three dimensional image is created of a volume containing many point reflectors, the sidelobes create a more or less continuous backround level. If this background level is subtracted out (or truncated) before the shadowgraphs are created, the relative sidelobe level will not be degraded as much.

Another method of reducing sidelobe levels is to use a nonlinear form of combination in the reconstruction process (as contrasted with only using addition). A nonlinear form of combination may be used when forming the shadowgraphs in place of integration.

SUMMARY

This invention will provide a three dimensional image after transmitting a single pulse of energy using the echoes received by a sparse array of receiver elements.

It will image a three dimensional volume in real time or near real time and provide a means of reconstructing a three dimensional image of objects using echoes resulting from the transmission of a single pulse of energy while avoiding grating lobes and other interference effects when using a sparse array of receiver elements.

It uses a reconstruction technique based on the speed of propagation of elementary wavelets generated by the transmitter and reflecting points on objects. Each echo sample at each receiver element represents the integral of the imaged object field over an ellipsoid of revolution. Thus the echo samples are projections of the field of objects over ellipsoids of revolution. Reconstruction is done by backprojection of these projections. The backprojection algorithm is very simple and fast.

Some additional objects of this invention are:

To illuminate or insonify a wide angular volume uniformly with the transmission of a single pulse of energy.

To provide a means of viewing three dimensional data on a two dimensional display.

To provide a means for reconstruction an image which provides relatively uniform resolution throughout the imaged volume.

To use a simple reconstruction method which uses one geometrical step.

To use a reconstruction method which is based on rectangular coordinates.

To reconstruct the image of objects causing echoes directly from the stored time history of echoes received at such element of the receiver array.

To use a reconstruction algorithm which uses the combined distances from the transmitter to the reconstruction point and from the reconstruction point to the receiver element as a basis for reconstruction.

To reconstruct three dimensional images and tomographic images from the array element time histories without the use of large intermediate memories. To use a reconstruction alogrithm which can reconstruct points in any order within the insonified three dimensional volume and thus facilitate the reconstruction of variously oriented volumes and tomograms viewed from various perspectives.

To use a reconstruction algorithm which inherently takes into account the wavefront curvature of the transmitted pulse.

To use a reconstruction algorithm which makes no fresnel, fraunhofer, or similar approximations.

Further objects and advantages of this invention will become apparent from consideration of the drawings and descriptions of the preferred embodiment.

BRIEF DESCRIPTION OF THE DRAWINGS

FIG. 8 shows 3D memory elimination.

FIG. 9 further shows 3D memory elimination.

FIG. 10 shows an object oriented display.

FIG. 11 shows elimination of both 3D and time history memories.

FIG. 12 shows multiple transmitters.

FIG. 13 shows multiple redundant pulses/summing into echo time history memories.

FIG. 14 shows multiple redundant pulses/summing into image pixels.

FIG. 15 shows an echo recording device.

FIG. 16 shows oscillation compensation.

FIG. 17 shows the echo geometry.

FIG. 18 shows echo and reconstruction geometry for two receiver elements.

FIG. 19 shows Echo and reconstruction geometry for four receiver elements.

FIG. 20 shows an axicon array.

FIG. 21 shows a lidar embodiment.

FIG. 22 shows a radar embodiment.

FIG. 23 shows a sonar embodiment.

FIG. 24 shows a particle beam embodiment.

DESCRIPTION OF THE PREFERRED EMBODIMENT

Description Of The Preferred Embodiment—medical ultrasound

Figure 1:
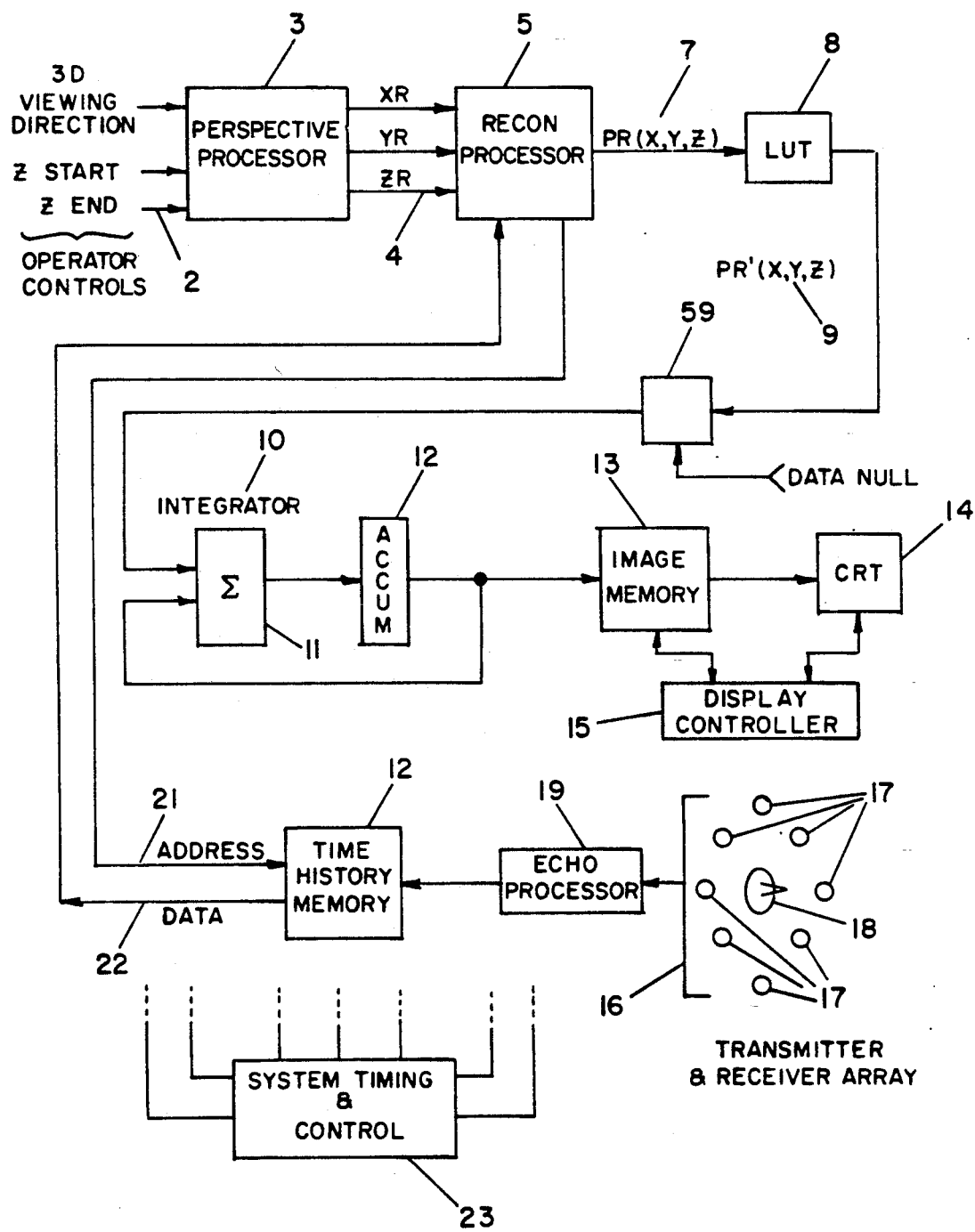
FIG. 1 shows a block diagram of the single pulse imaging system.
Figure 2:
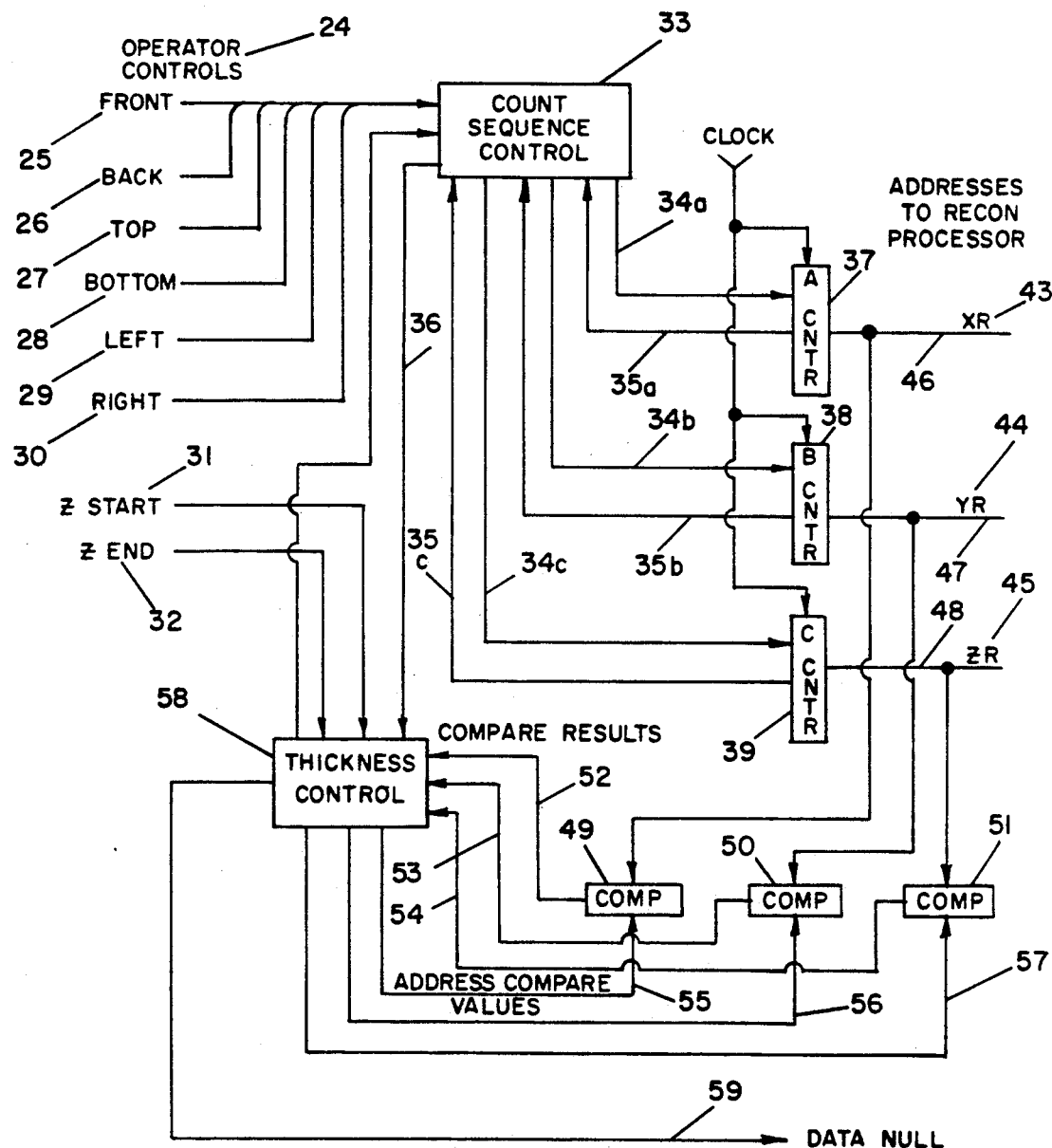
FIG. 2 shows a block diagram of the perspective processor which controls the reconstruction sequence to generate three dimensional or tomographic views from user selectable perspectives.

The apparatus described herein is a means of imaging three dimensions with the transmission and reception of a single pulse of ultrasonic energy. FIG. 1 is a system block diagram. A single transmitting element (18) is located at the center of a sparse circular array (17) of receiver elements. The transmitter emits a single unipolar pulse of energy. A multicycle pulse may be used if the echoes are converted to unipolar pulses by rectification at the receiver elements before further processing occurs. The pulse shape may be a half cycle sinusoid, a gaussian pulse or any other monopolar pulse. A gaussian shape is efficient in that it contains a relatively small higher harmonic content. If a single cycle or multicycle pulse is used with a small transmitter element, a wide solid angle may be insonified uniformly. Then these pulses may be considered noninterfering pulses for the purpose of insonification of the imaged volume. This is illustrated in patent number 4,688,430. Most mediums to be imaged attenuate higher frequencies more than lower frequencies. The ratio of the diameter of the transmitter to the length of the transmitted pulse determines the size of the solid angle that will be insonified uniformly. As the pulse propagates away from the transmitter, objects in its path will generate echoes that propagate back toward the receiver array. These echoes are detected by the elements (17) of the receiver array. Because a unipolar pulse is used, the receiver array elements may be spaced far apart creating a large sparse aperture which will have better lateral resolution than the same number of elements configured into a dense array. With a unipolar pulse no grating lobes will occur.

A sparse array is an array of elements that, for the purposes of this application, are placed no closer together that one half the spatial length of the transmitted pulse. A sparse receiver array would then be an arrangement of receiver elements that are spaced no more closely than one half the spatial length of the transmitted pulse. A similar definition would apply to a sparse transmitter array or, in general, to a sparse array. The spatial length is given by the product of the time duration of the pulse and its propagation velocity.

The echoes detected at each receiver element are amplified, processed and digitized by the echo processor (19) and then stored in time history memory (12). They may also be stored in an external memory such as a disk drive for later use. These echo samples are projections over ellipsoids of revolution of the imaged objects as is shown in FIGS. 17,18,19. A pulse is generated by the transmitter. It propagates though the object field as an expanding spherical surface or radius RTP (FIG. 17—303,306). As the surface encounters points in objects (FIG. 17—300,301), wavelets of radius RPE (FIG. 17—304,305) are generated which propagate back toward the receiver elements (FIG. 17—308, FIG. 18—312,314, FIG. 19—317,318,319,320). These are echoes which are detected by the receiver elements and recorded in the time history memories (FIG. 1—12). The elapsed time from pulse transmission to an echo sample defines the round trip distance, RTP+RPE, from transmitter to reflecting point and back to the receiver element (FIG. 17—303,304). There are numerous points which can contribute to a particular echo sample. These are all of the points which lie on an ellipsoid of revolution with the foci being the transmitter and the particular receiver element (FIG. 17—302). The eccentricity is effected by the round trip distance which is equal to the major axis. Therefore each echo sample from each receiver element represents a projection of the object field over an ellipsoid of revolution (FIG. 17—302, FIG. 18—309,310, FIG. 19—322).

Referring to FIG. 1, system timing and control (23) synchronizes, controls and coordinates the various elements of the imaging apparatus. The perspective processor (3) is responsive to the operator controls (2) which determine the direction or perspective from which the final image will be viewed. The perspective processor also allows the operator to determine the thickness of the three dimensional volume which will be viewed on the final two dimensional display (14). This is done by removing front portions and rear portions of the image in a direction orthogonal to the viewing screen (14). The thickness of the portions to be removed are determined by the z start and z end operator controls (2). By using these controls the image may be reduced to a tomogram located at any position orthogonal to the viewing screen. The three dimensional viewing direction is also an operator control (2) and allows the imaged volume to be viewed from the front, back, top, bottom, right side, or left side. This, in conjunction with the z start and z end controls, allow viewing of the imaged volume from six different directions and also allow viewing volumetric images of various thicknesses, positions and orientations in addition to tomographic images of various positions and orientations. The perspective processor (3) sequences the three dimensional reconstruction points (4) that are fed to the recon processor (5). It does this in such a manner that fixed sequences of reconstructed points (7) may be summed by the integrator (10) and the results stored in the accumulator (12) to form one pixel at a time of the final two dimensional view through the three dimensional volume.

The look up table (8) provides a means of shading the two dimensional view through the three dimensional volume so that a front to back gray scale perspective is formed. The look up table can also be used for other image processing functions by programming its contents with other values. The look up table mapped, reconstructed points (9) are fed to the integrator (10). The adder (11) sums these points with the data in the accumulator (12) and replaces the data in the accumulator with the results. This process constitutes a weighted integration of the reconstructed three dimensional volume in a direction orthogonal to the screen of the final two dimensional display (14). The integrated three dimensional data sequences each form one pixel in the two dimensional image memory (13). The data in this memory is converted to a composite video signal by the display controller (15) and is used to drive the cathode ray tube (14).

Detailed Description Of The Preferred Embodiment

Figure 3:
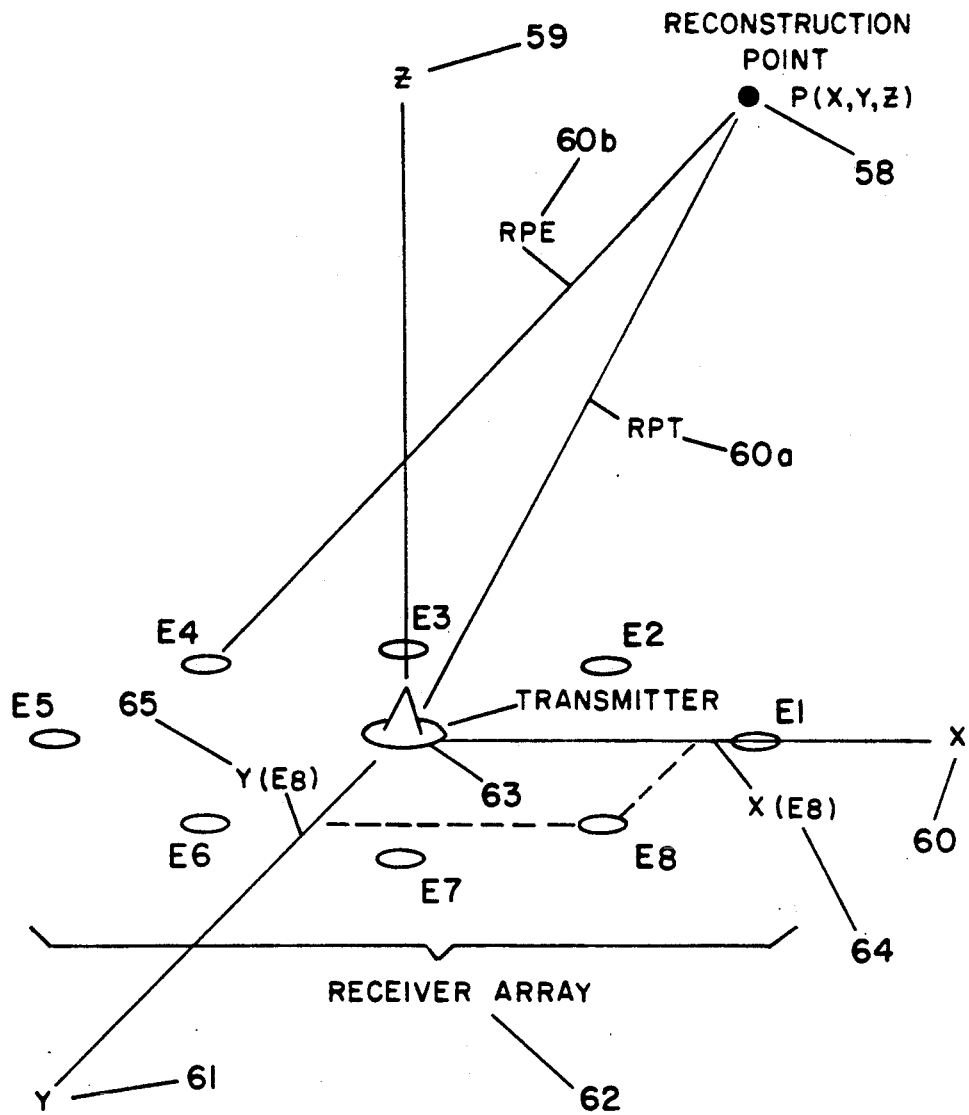
FIG. 3 shows the reconstruction geometry including transmitter and receiver and also the particular point to be reconstructed.

FIG. 3 is a drawing of the reconstruction geometry. The receiver array is in the x y plane and consists of a sparse array of receiver elements (62) evenly spaced on the circumference of a circle. Thus in this embodiment the receiver is an axicon constructed with a sparse array. The transmitter (63) is located at the origin of the x y z coordinate system and transmits a pulse in the z direction. An example reconstruction point is shown at (58). RPE (60b) represents the distance that an echo must travel from the reconstruction point (58) to receiver element E4. RPT (60a) represents the distance that an acoustic pulse must travel from the transmitter (63) to the reconstruction point (58). The sum of RPE and RPT defines the eccentricity of an ellipse of revolution, FIG. 17—302.

Figure 6:
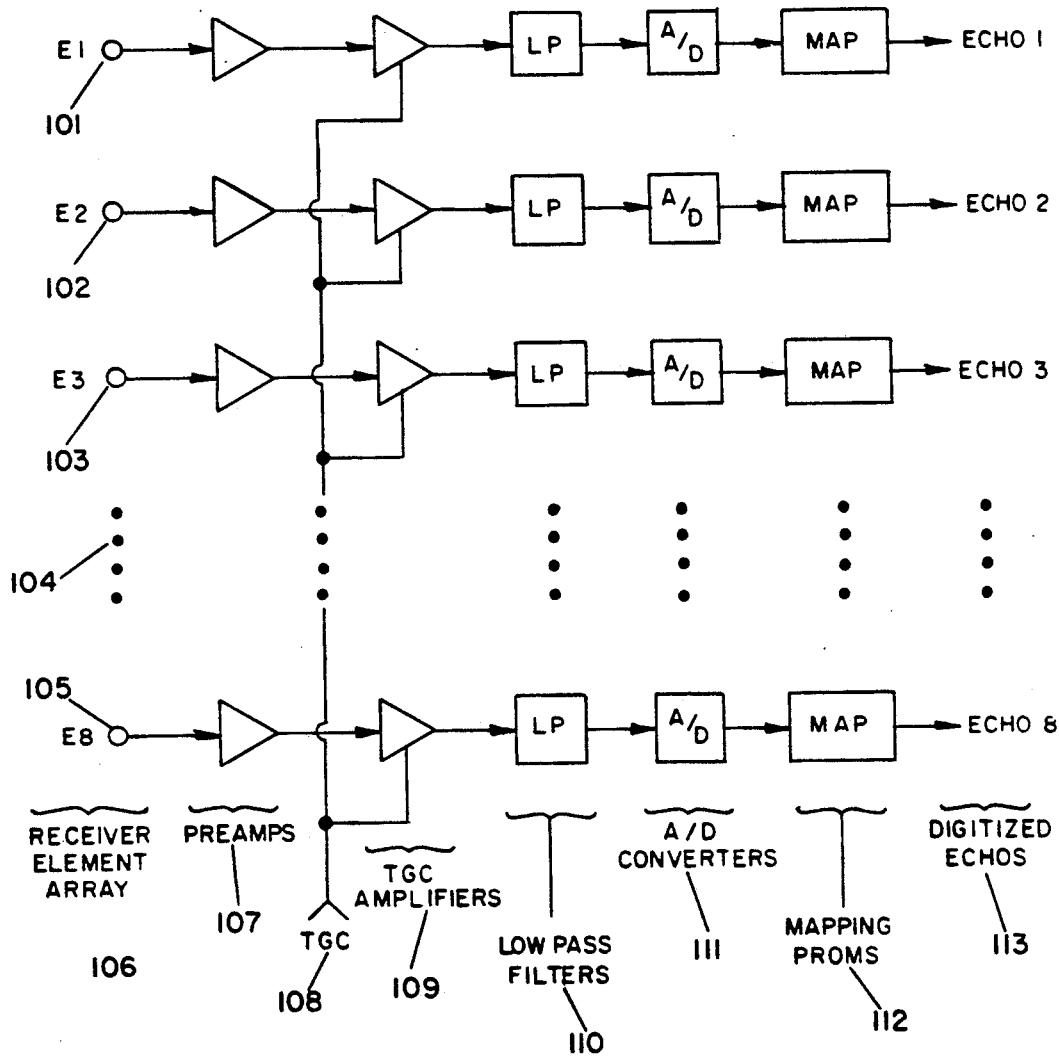
FIG. 6 shows the echo processor which first receives the echo data from the receiver elements.

FIG. 6 shows the echo processor which receives echo data from the receiver arrays elements (106). The preamplifiers (107) increase the magnitude of the echoes to reduce the effects of noise further along in the system. The time gain compensation amplifiers (109) provide a time varying gain to compensate for attenuation in the imaged medium which is a function of the echoes time of flight. The tgc input (108) consists of an adjustable ramp which increases the gain for echoes coming from reflectors further away from the receiver array. The low pass filters (110) are necessary to prevent aliasing. The analog to digital converters (111) convert the echoes to digital samples. The mapping proms (112) can be used for various types of dynamic range compression or expansion while the data is in sampled wavefield form. The output signals are the digitized echo samples (113). Each sample represents a projection of the object field over an ellipsoid of revolution, refer to FIG. 17,18,19.

FIG. 1 (12) shows the time history memory which receives the processed and digitized echo data from the echo processor. This memory consists of two alternating memories, one being read into while the other is being read out of. The data in the memory is a sampled and processed, but geometrically distorted, replica of the time history of the wavefield incident on the surface of the receiver array.

Figure 4:
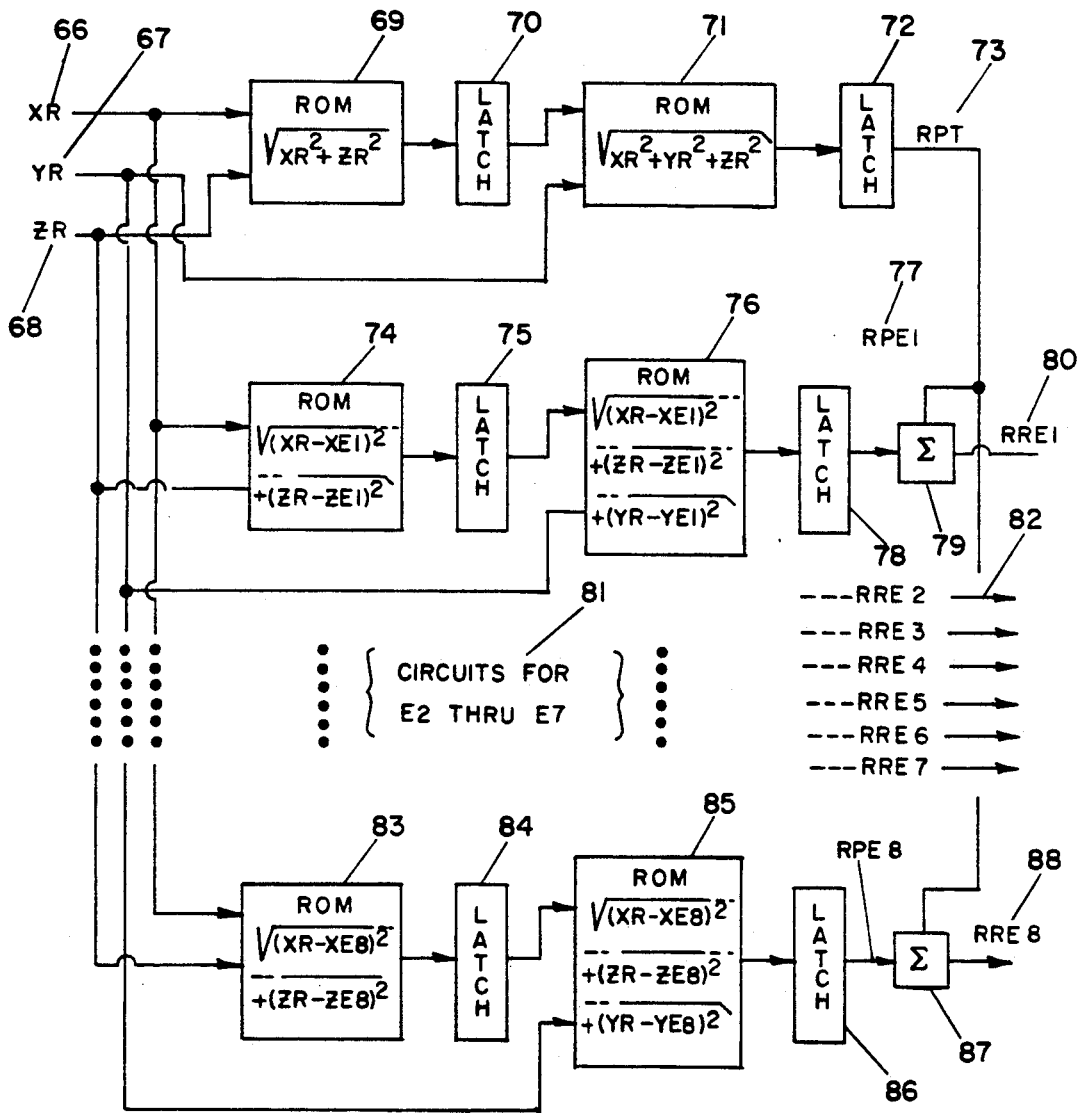
FIG. 4 shows the reconstruction address generator which takes the reconstruction point coordinates as an input and computes the appropriate time history addresses as outputs.
Figure 5:
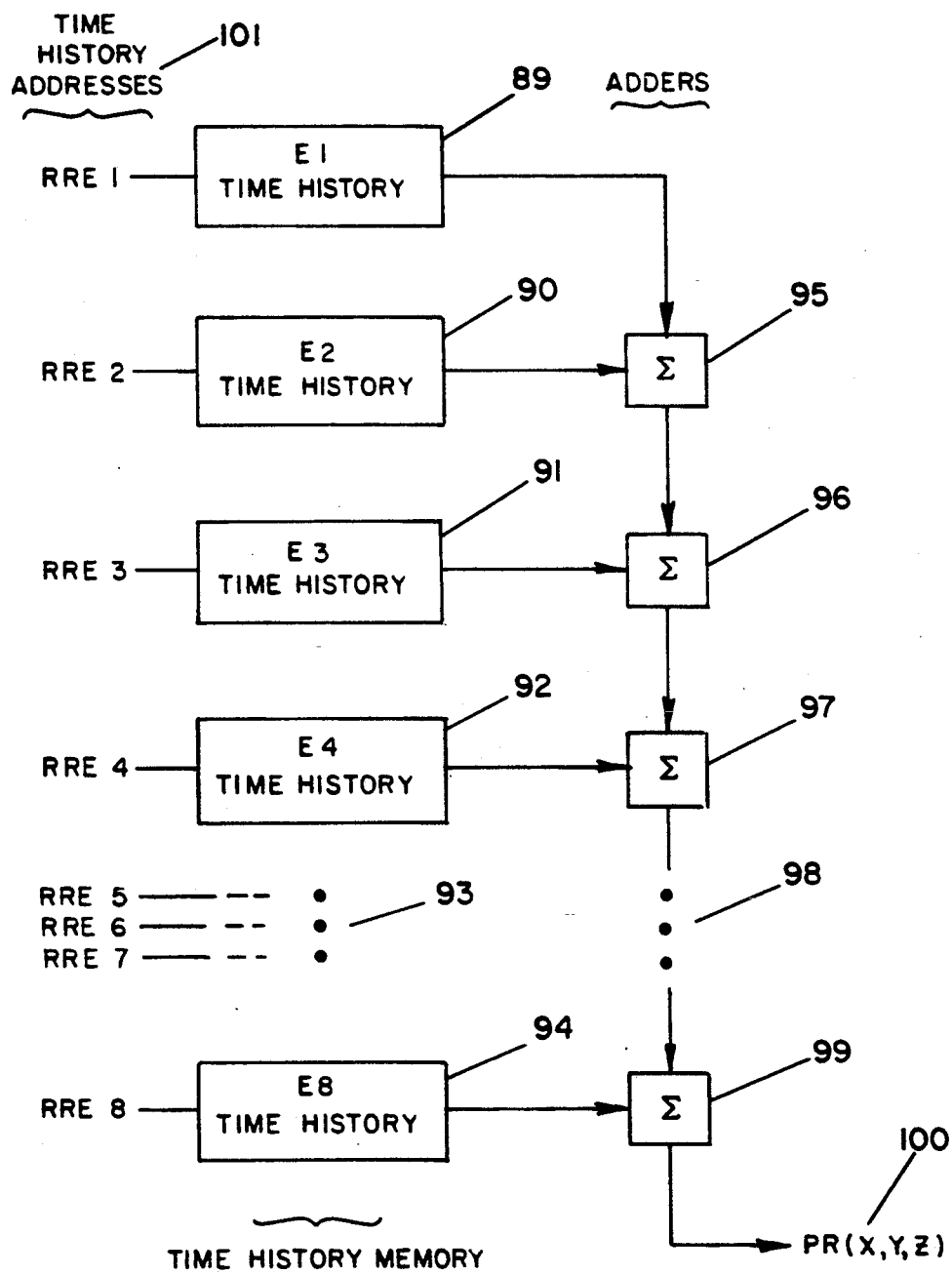
FIG. 5 shows the reconstruction summer which sums the appropriate time history data together to reconstruct an object field point.

Figure two is a block diagram of the perspective processor. The perspective processor controls the direction from which the three dimensional imaged volume is viewed. It also controls the thickness of the tomographic images and their location within the imaged volume and, in addition, the thickness of the tomogram. The count sequence control (33) accepts inputs from the operator controls (24) and configures the counter control lines (34a), (34b), (34c) to the address sequence counters (37), (38), (39). It does this such that the correct sequence of reconstruction point addresses (43), (44), (45) are fed to the recon processor. The counter control lines configure the counters in count up or count down mode, preset them to the correct value, and determine the interconnection of the carry in and carry out signals. The thickness control (58) accepts z start (31) and z end (32) operator controls and monitors the counter values (46), (47), (48) by loading comparison values (55), (56), (57) into the comparators (49), (50), (51). If the counter values are outside the range as determined by the z start (31) and z end (32) controls it activates the data null signal (59) which causes data values of zero to be fed into the integrator FIG. 1, (10). FIG. 4 is a block diagram of the reconstruction address generator. The reconstruction address generator sends a stream of addresses to the reconstruction summer (FIG. 5) which controls the way in which the time history memory data (FIG. 1—12) is summed to reconstruct image points. The reconstruction algorithm is implemented in hardware by programmable logic and is a parallel pipelined structure. For each point to be reconstructed in the three dimensional volume (xr,yr,zr) (66,67,68) the recon address generator computes the appropriate addresses (82) for the recon summer (FIG. 5). Given the reconstruction point coordinates and the time of flight, or equivalently (within a constant multiplier, the total travel distance), the distance from the transducer to the point, rpt (73) is computed by the two programmed roms (69, 71). To minimize rom size the first rom computes the distance to xr, zr and the second rom takes this distance and the zr coordinate and computes the final distance rpt. The rest of the rom circuitry is used to compute the distances from the reconstruction point to each of the receiver elements. There are eight sets of roms similar to the two roms (74, 76). Each set is programmed to compute the distance for one of the eight receiver elements e1 through e8 (FIG. 3). The first rom of each rom pair computes the distance projected in the x z plane and the second rom takes this distance along with the y coordinate of the reconstruction point and computes the final distance rpe (77). The summers (79, 87) sum two the distances together to form the total distance from transmitter to reconstruction point to receiver element for each receiver element in the receiver array. This combined distance defines the major axis of an ellipse of revolution upon which lie the points responsible for echoes which make up a single echo sample. Then, each sample at each receiver element has a total travel time and total travel distance associated (FIG. 17—303,304,305,306) with it which defines the eccentricity of the ellipse (FIG. 17—302, FIG. 18—309,310, FIG. 19—322). The coordinates of the particular receiver element and the coordinates of the transmitter define the locations of the two foci (FIG. 17—307,308, FIG. 18—312,313,314, FIG. 19—317,318,319,320,321). Thus each sample from each receiver element has a unique ellipse of revolution associated with it. The sample represents the surface integral of the object field over this ellipse.

The speed of sound is used as a scale factor in producing the output addresses (80, 82, 88) which are sent to the reconstruction summer (FIG. 5). The separate rom pairs for each element form the parallel architecture whereas the latches (70, 72, 75, 77, 84, 86) form a pipelined architecture in that the reconstruction speed is governed by the single slowest element in the circuit rather than by a sum of circuit element delays.

FIG. 5 shows the reconstruction summer (recom summer) which adds the appropriate time history data together to reconstruct each image point. The time history addresses (101) are generated by the reconstruciton address generator (FIG. 4) and cause the appropriate data to be accessed in each elements time history memory (89, 90, 91, 92, 93, 94). This data is summed by the adders (95, 96, 97, 98, 99) to form the reconstructed point pr (x, y, z) (100).

This reconstruction summation process constitutes the backprojection of time history samples over ellipsoids of revolution (FIGS. 18, 19) in the same manner that the time history samples reprsented projections of the object field over ellipsoids of revolution. It is the inverse of the original sampling process. The eccentricity of the back projectd ellipsoids is determined by the distance from transmitter to reconstruction point and back to the particular receiver element from which the time history was generated (FIG. 17—303, 305). The foci of the ellipsoids are the locations of the transmitter and the particular receivers (FIG. 19—317, 318, 319, 320, 321). The reconstructed point and its sidelobe structure is the summation of backprojected ellipsoids from each of the receiver elements, refer to FIG. 19.

FIG. 1 which is a system block diagram shows the integrator (10), the image memory (13), the crt display (14), and the display controller (15). These components function together to provide a display of the three dimensional imaged volume or selected tomographic images. The integrator receives reconstructed points from the reconstruction processor (5) in a sequence consisting of subsequences such that the summation of each subsequence forms one pixel for the two dimensional display. Each pixel then represents a view along a line through a three dimensional volume. The integrator forms these subsequence summations by using results fed back from the accumulator (12). The resulting pixels are placed in the appropriate locations in the image memory (13). The image memory consists of two alternating memories, one in read mode and one in write mode. The display controller (15) forms a composite video signal using the data in image memory and the video synchronization signals. This video signal is fed to the cathode ray tube (14).

Description Of The Second Embodiment—lidar

Refer to FIG. 21

This imaging system uses a circular very sparse array of light detector elements (328) with a light emitter (329) located near the center. The emitter generates a very short pulse of light (326) which propagates outward through a wide solid angle (327). Objects in the path of the propagating pulse reflect light back toward the detector array. Each element in the detector array consists of a light collector and a light detector. The collector redirects the incident light on to the detector. The detector converts the light to an electric signal which is recorded as a function of time in the elements time history memory. The image reconstruction is performed as described in the preferred embodiment.

Description Of The Third Embodiment—underwater sonar

Refer to FIG. 23

This system uses a vertical sparse array of sonobouys (340, 341, 342) as a receiver array. The buoys are anchored (344) in place. The transmitter is an acoustic projector (343) located near the center of the array. The transmitter generates a short monopolar pulse which propagates outward through a wide solid angle. Objects in its path cause echoes which propagates back toward the receiver array which convert them to electric signals (339) which are transmitted back to a remotely located image reconstruction system. There they are recorded in the individual elements time history memories. Image reconstruction follows the description in the preferred embodiment with modifications for a different propagation velocity and different geometry.

Description Of The Fourth Embodiment—particle imaging

Refer to FIG. 24

This embodiment uses a short pulse of particles (346) to reconstruct a three dimensional image. The receiver array is an approximately circular, very sparse array of particle detectors (348). The transmitter is a particle emitter (349) located inside or outside of the receiver array. The transmitter generates very short burst of particles (346) which propagate out through a wide solid angle (347) with uniform velocity. Elastic collisions with objects in the path of the propagating pulse cause particles to be reflected back toward the receiver array. The particle detectors in the receiver array generate electric signals proportional to the number of incident particles. These signals are recorded as a function of time in the individual elements time history memories. Image reconstruction takes place as described in the preferred embodiment.

Description Of The Fifth Embodiment—radar

Refer to FIG. 22

This imaging system uses echoes caused by the transmission of a single radar pulse (333) to reconstruct a three dimensional image. The receiver is an approximately circular, very sparse array of radar antennas (335, 336, 337). An electromagnetic transmitter (338) is located inside or outside of the array. The transmitter generates a monopolar or multicycle pulse (333) which propagates out through a wide solid angle (334). Objects in its path cause echoes which propagate back toward the receiver array. The echoes are detected at the individual elements and rectified and filtered if a multicycle pulse was used. They are converted to electric signals which are recorded in each individual element's time history memory. Image reconstruction occurs as described in the preferred embodiment.

Elimination of the Time History Memories

Figure 7:
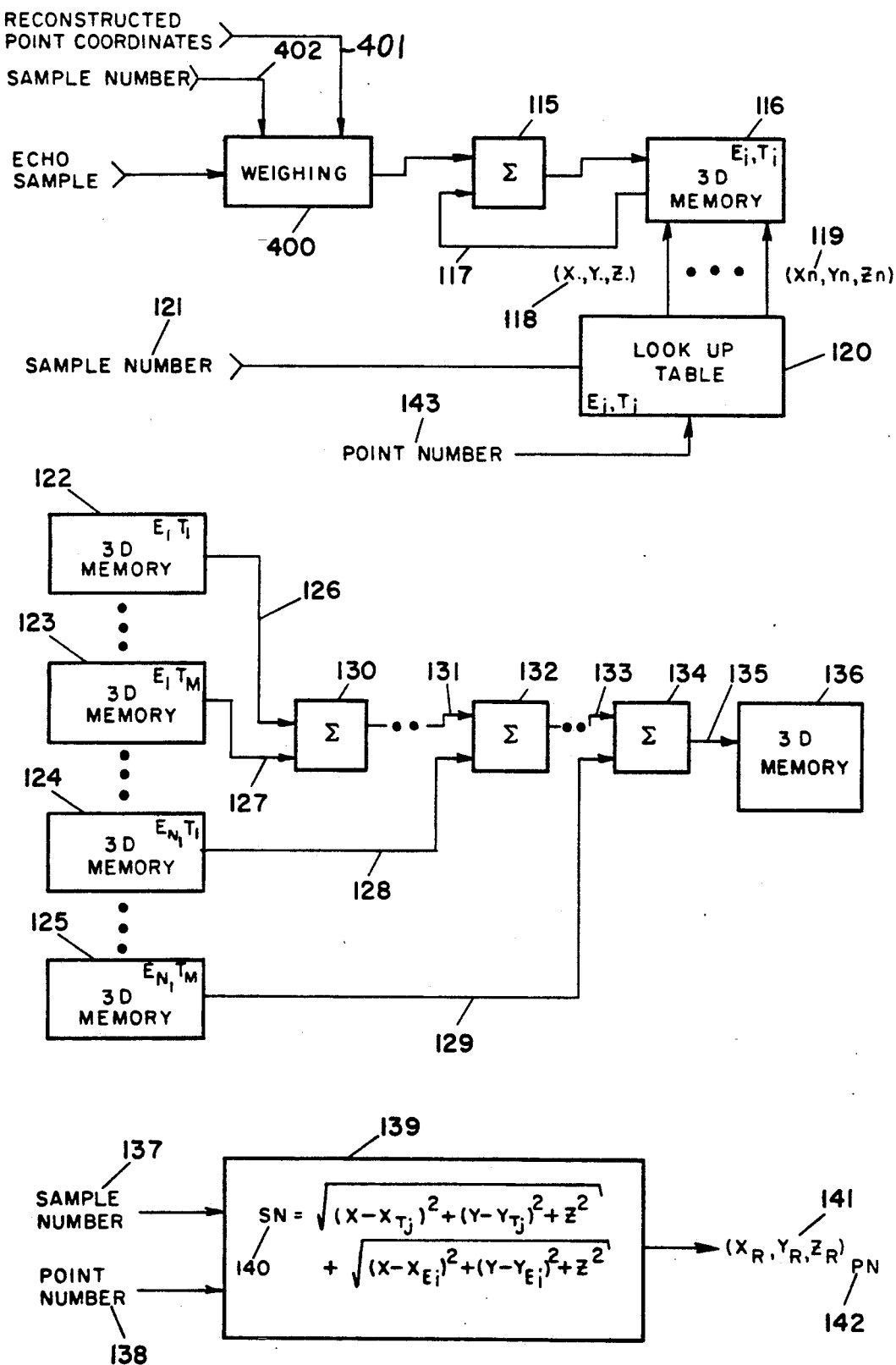
FIG. 7 shows time history memory elimination.

Refer to FIG. 7

This improvement will sum echo samples immediately, as they are sampled, into the appropriate reconstruction points. If this is done, no time history memory is required.

Each echo sample (114) is summed by the adder (115) into the appropriate voxel (117) in the 3D memory (116). In the illustrated implementation there is a separate 3D memory for each receiver/transmitter combination (Ei, Tj). This provides maximum reconstruction rates, but may require too much electronics if there are many receiver/transmitter elements. A single common memory may be used if it is multiplexed or time shared by echo samples from different receiver elements.

The look up table (120) controls the voxel addresses (118, 119) for the 3D memory. Since there are several voxels into which a given echo sample will be summed, the point number input (143, 138) selects among the several voxels allowing the samples to be summed into each of them in sequence. The contents of the lookup table is determined by the equation (140) which gives the points on an ellipsoid given the sample number (121, 137) and the transmitter/receiver elements coordinates.

The individual 3D memories (122, 123, 124, 125) voxels (126, 127, 128, 129) are summed by adders (130, 131, 132, 133, 134) into the final 3D memory (136).

Elimination of the 3D memory

Refer to FIGS. 8 and 9

This design variation will sum the echo samples (144, 184), either from time history memories or directly as the echoes are sampled, into the appropriate pixel locations in the tomogram image in the tomogram memory (147) and the shadowgraph image in the shadowgraph memory (186). This eliminates the requirement for a 3D memory.

Alternately, the reconstruction points may be reconstructed in a register and then directly transferred to the appropriate locatins in the tomogram memory and summed into the appropriate locations in the shadowgraph memory.

If echo samples are summed into the tomogram memory an additional adder (350) is required.

The FIGS. are oriented toward writing reconstructed points into the memories. In synchronism with the reconstructed points are the reconstructed points coordinates (145, 183). The coordinates are input to the tomogram processor (149) and the shadowgraph processor (190). The tomogram processor has as additional inputs, the tomogram position (150) and the tomogram orientation (151). The shadowgraph processor has as additional inputs, the viewing orientation (192) and the viewing position (193). Both processors generates write pulses (146, 188) and memory addresses (148, 189).

The tomogram processor contains lookup tables derived from the equation of a plane (351). The tomogram orientation inputs (171) provide the coefficients, alpha, beta and gamma (172, 173, 174), for the equation, these are multiplied (175, 176, 179) by the reconstruced point coordinates (180, 181, 182) and summed by adders (177, 178) to form the left side of the equation (170). The tomogram position (169) provides the constant factor (167) after being scaled by a lookup table (168). The opposite sides of the equation are tested for equality by the comparator (166). Equality is anded (164) with a write clock (163) to generate the write pulse (165).

The tomogram processor also generates memory addresses (148, 152, 153). The reconstruction point coordinates (161, 158, 159, 160), tomogram position and tomogram orientation (156, 157, 162) are inputs to prom based algorithm processors (154, 155) which generate the addresses (152, 153).

The shadowgraph processor (190) takes the reconstruction point coordinates (191), the starting viewing position (193) and the viewing orientation angles (204, 205, 206, 192), associated with the x, y, z base coordinates, and formulates the equations (194) of straight lines which represent the line integrals which will become pixels in the shadowgram. The raster generator (214) generates a sequence of pixel addresses (212, 213) representing the pixels in the shadowgram. These are used in conjunction with the shadowgram position (203) by the vector tail generator (202) to generate the vector tail addresses (201). The vector tail addresses are subtracted (199) from the reconstruction point coordinates (200). The result (198) is one input to a three stage comparator (197) which will generate a memory write pulse (195). The vector incrementor (211) increments a parameter (210) which is multiplied (207, 208, 209) by the shadowgraph orientation angles (204, 205, 206). The results are the other input (196) to the three stage comparator.

Elimination of Both 3D and Time History Memories

Refer to FIG. 11

This variation will sum echo samples directly into the tomogram and shadowgraph pixels without using echo time history memories or a 3D memory.

The technique is the combination of the foregoing techniques to eliminate each of the two memories separately. The echo samples (232) from each of the n elements (230, 231) are transferred directly (233) to the tomogram summer (352) and the shadowgraph summer (238). The tomogram processor (236) controls the tomogram memory write pulse and addresses (235). The shadowgraph processor (237) controls the shadowgraph read/write pulses and addresses (242). The summer (238) combines the echo samples (233) with memory locations (240) to reconstruct pixels and perform the integration (241).

Object Oriented Display

Refer to FIG. 10

This display technique allows the tomogam, the shadowgraph and the graphics display to maintained as separate objects to be combined into the rs170 video signal. This eliminates the need for a separate complete display memory and allows the display objects to be repositioned (229) or modified separately by the user.

The three separate imnage objects (215, 216, 217) addresses and read pulses (224, 225, 226) are controlled by the rs170 processor (227) which also controls (223) the multiplexer (221). The processor, as the rs170 pixel scan progresses, combines pixels (222) into the rs170 video signal, as appropriate, from either the tomogram (218), shadowgraph (219) or graphics (220) memories.

Signal To Noise Improvement With Echo Time History Integration and Redundant Transmitted Pulses Refer to FIG. 13

Integrating an image over several frames is a technique commonly used to increase the image signal to noise ratio. If the noise is uncorreleated from one frame to the next, the signal to noise ratio is increased by the square root of the number of integrations. For each frame integration this involves summing each new pixel with each old pixel. For a three dimensional image this would be time consuming because of the large number of pixels.

This invention uses a reconstruction technique and system architecture that allows the same type of signal to noise improvement without having to sum individual pixels. Consecutive frames may be integrated by summing in the time history memories instead of the image memory and the effects will be similar. There is much less data stored in the time history memories before image reconstruction which greatly reduces the number of additions required for a full frame integration. This saves hardware and processing time. Referring to FIG. 13, the time history memories (251, 252) contain the echo time history from the last transmitted pulse. As new echoes (247, 248) are received from a new transmitted pulse, the echo samples are added (249, 250) to their counterparts from the last transmitted pulse. This can be continued indefinitely if the addition results are shifted right as the addition results fill up the capacity of the individual time history memory locations.

Signal to Noise Improvement With Image Integration and Redundant Transmitted Pulses Refer to FIG. 14

As before, since in some imaging applications there is time for more than one transmitted pulse per image frame, multiple pulses may be transmitted and the resulting echoes combined into the same image to provide increased signal to noise ratios.

The echoes from each pulse may be used for a complete image reconstruction. The reconstructed pixels or voxels may that be summed into the previously reconstructed image. The process may be repeated for several transmitted pulses. The reconstructed image points (255) are sent to summers (256, 257) for the tomogram memory (258) and the shadowgraph memory (259). The summers perform the integration of image points resulting from several transmitted pulses. Sidelobe Reduction With Multiple Offset Transmitters Refer to FIG. 12 Sidelobes are created in the point response of the imaging system when back projected ellipses coincide at locations other than the actual location of the reconstruction point, refer to FIGS. 17—302 and 18—309. Integration of consecutive frames does not reduce the sidelobe level if the same elements are used for transmission and reception each time. However, if the transmission originates from a diferent location, because of offset transmitters, in each consecutive transmitted pulse, then, for a particular receiver element and particular reconstruction point, the back projected ellipses will coincide only at the location of the reconstruction point. Then, when integration over consecutive frames is done, the sidelobe levels will be reduced. The amount of the sidelobe reduction is proportional to the number of frame integrations with transmissions originating from offset transmitters and is therefore proportional to the number of offset transmitters. The receiver elements (244) may be used as the multiple transmitters (243) or a separate transmitter array (245) may be used with the receiver array (246).

Receiver Elements Used As Transmitters

Refer to FIG. 12

The previously described embodiments show transmitters that are separate from the receiver elements.

However, if the receiver elements can also be used as transmitters, a complete transmit receive array could be formed by a circular array of elements (244). Each element in the array (243) could be used, one at a time, consecutively for pulse transmission. If consecutive frame integration was implemented, sidelobe reduction and signal to noise improvement would be achieved without an increase in the number of array elements.

Weighted backprojections to compensate for element radiation patterns and other phenomena.

Refer of FIGS. 7, 17, 18, 19.

Backprojections may be weighted (400) as a function of the sample number (total round trip time of flight, RTP+RPE) (402) or as a function of the reconstruction points coordinates (401) or both. The transmitter and receiver elements have radiation patterns which may be partially compensated for by weighting the backprojections as a function of the reconstruction points coordinates. Finite area transmitter/receiver elements cause an actual backprojection pattern that is wider in the off axis direction (353, 354). The echo sample represented by the backprojected ellipsoid can then be weighted as a function of the off axis angle (356) as it is summed into the various reconstruction points. The ellipsoidal backprojections differ in length or area (309, 310) depending on the sample number and the position of the foci (312, 313, 314). The echo samples can be weighted to take into account the total surface area of the backprojected ellipsoid.

Recording the Echo Histories in Recording Devices

Refer to FIG. 15

A recording device (264) may be added which, when connected (263), can record a sequence of echoes from the time history memories (265) of each of the receiver elements (261, 262). The recorded echoes may later be played back into the time history memories for reconstruction of the image (266) by the rest of the imaging machine.

Axicon Array with Reduced Sidelobe Levels

Refer to FIG. 20

If more elements are added to a sparse circular array (324), the array will become a phased annulus or axicon. This type of aperture does not have grating lobe problems, but has very high sidelobe levels when used with oscillating transmitted pulse. If non oscillating or noninterfering pulses are used the sidelobe levels are reduced. If, in addition, multiple transmitters (325) and multiple redundant pulses are used, the sidelobes are further reduced.

Oscillation Compensation

Refer to FIG. 16

A non oscillating transmitted pulse may be hard to achieve in certain types of imaging systems. Also, if a non oscillating pulse is transmitted (267), propagation effects (268) may cause oscillations to build up (269). This may be compensated for by detecting or rectifying (271) the echo (270) and then filtering it (272) to generate corrected pulses (273) which are then used for image reconstruction.

Alternately, time varying filter may be used where the filter coefficients are made a function of the sample number or time of flight to account for differing propagation effects depending on the round trip time of flight of the echo. The echoes (275) are digitized (274) and fed into a sequence of latches (276, 277, 278, 279, 280). The latch outputs (291, 289, 287, 285, 283, 281) are multiplied (292, 290, 288, 286, 284) by the filter coefficients which are stored in a PROM (293). The prom address (294) is sequenced as a function of time of flight. The multiplication results are summed (295, 296, 297, 298, 299) and the result is a corrected pulse which is then used for image reconstruction.

Background Level Reduction

Refer to FIG. 19

A shadowgram is created by integrating along viewing vectors (316) through a reconstructed three dimensional volume. When this is done the sidelobe levels (322) are summed which obscures the resulting shadowgram. The sidelobe levels create a relatively constant ambient level in the reconstructed three dimensional image. If this level is subtracted out before the shadowgram is created, the sidelobes will not be integrated into the resulting image.

While the above descriptions contains many specifics, these should not be construed as limitations on the scope of the invention, but as an example of several embodiments. The imaging concept can be implemented with any type of energy that can be transmitted as a spherical, expanding, radiating pulse of short duration with predictable velocity of propagation. The receiver array can be any shape, although circular is typically optimal. The transmitter can be located at any position with respect to the receiver array.

The tomograms may be extracted in a more flexible manner by implementing, in hardware, equations that describe the tomographic plane and then by using these equations to extract voxels from the 3D image to be used as tomographic pixels.

The viewing perspectives through the 3D volume may be made more continuously variable by implementing in hardware the viewing perspective vector and using it to generate 3D memory addresses to access voxels to be summed, thus causing the integration.

What is claimed is:

1. A three dimensional active imaging device capable of generating a three dimensional image of reflecting points on or within objects in a three dimensional volume, within which the propagation velocities of the transmitted energy and the echo energy are known, said volume being external to a sparse array of receiver elements, comprising:
   a) A transmitter, which transmits a pulse of energy which radiates through a wide solid angle;
   b) A means for detecting echoes, from the reflecting points, caused by said pulse of energy, simultaneously at three or more of the sparsely spaced receiver elements arranged in a two or three dimensional array;
   c) A means for sampling said detected echoes from each receiver element of said sparsely spaced receiver elements whereby an echo sample set is created;
   d) A means for selecting and combining with each other, for each particular image of each reflecting point, one echo sample from each receiver element, whereby an image is created of the reflecting points, said selecting and combining means utilizing, for selection, the sum of: the distance from the transmitter to the particular image point divided by the known propagation velocity of the pulse of energy, and the distance from the particular image point to each receiver element divided by the known propagation velocity of the echoes.

2. A three dimensional active imaging device for generating a three dimensional image of points on or within objects in a three dimensional volume within which the propagation velocity of transmitted energy and the propagation velocity of echo energy are known, said device using a reduced number of transmitted pulses and utilizing a two or three dimensional array of sparsely spaced receiver elements and one transmitter element means, comprising:
   a) One transmitter element means for generating a pulse of energy which will radiate uniformly through a wide solid angle in the three dimensional volume external to said array;
   b) A means for activating the transmitter element means whereby the pulse of energy is radiated;
   c) A means for simultaneously detecting echoes, caused by said radiated pulse of energy reflecting from said points, at three or more of the sparsely spaced receiver elements;
   d) A means for sampling said detected echoes from each of the receiver elements of said sparsely spaced receiver elements;
   e) A means for combining said samples into points of the image of the three dimensional volume, whereby the image is reconstructed, said means utilizing total time of flight of each of the echo samples to determine into which image points the echo samples should be combined, wherein said time of flight consists of the sum of: 1) the distance from the transmitter element means to the image point divided by the velocity of the transmitted pulse, and 2) the distance from the image point back to the receiver element divided by the velocity of the echo energy;

3. The device of claim 1 wherein the energy is an electromagnetic radar pulse.

4. The device of or claim 2 wherein the energy is an electromagnetic radar pulse.

5. The device of claim 2 wherein the energy is an underwater acoustic sonar pulse.

6. The device of claim 1 wherein the energy is a short pulse of light.

7. The device of claim 2 wherein the energy is an acoustic pulse used for non destructive testing of a solid material.

8. The device of according to claim 2 wherein the energy is an acoustic ultrasound pulse used for 3D, real time medical imaging.

9. The device according to claim 1 wherein the energy is a low interference pulse.

10. The device according to claim 2 wherein the energy is a low interference pulse.

11. The device according to claim 1 wherein the energy is a non interfereing pulse.

12. The device according to claim 2 wherein the energy is a non interfereing pulse.

13. The device according to claim 1 wherein the three dimensional image is created repetitively approximately every 33 milliseconds.

14. The device according to claim 4 wherein a new three dimensional image is created in less than 100 milliseconds.

15. The device according to claim 1 wherein there is included a parallel, pipelined means for combining echo samples to reconstruct the image points, said means having as input the image point coordinates, $(x_p,y_p,z_p)$, comprising:
   a) a plural parallel means for computing simultaneously the distances from the receivers to the image point comprising:
      aa) means for computing simultaneously first distances from the receivers to $(x_p,y_p)$ or $(x_p,z_p)$ or $(y_p,z_p)$;
      bb) means for using said first distances to compute the final distances to $(x_p,y_p,z_p)$;
      cc) means for simultaneously combining the distances from the receivers with the distance from the image point to the transmitter wherein the resulting combined distances represents the round trip travel distances from each receiver to the image point to the transmitter;
   b) means for using the round trip travel distances to simultaneously select echo samples to be combined whereby the image point is reconstructed.

16. The device according to claim 2 wherein there is included a parallel, pipelined means for combining echo samples to reconstruct the image points, said means having as input the image point coordinates, $(x_p,y_p,z_p)$, comprising:
   a) plural parallel means for computing simultaneously the distances from the receivers to the image point comprising:
      aa) means for computing simultaneously first distances from the receivers to $(x_p,y_p)$ or $(x_p,z_p)$ or $(y_p,z_p)$;
      bb) means for using said first distances to compute the final distances to $(x_p,y_p,z_p)$;
      cc) means for simultaneously combining the distances from the receivers with the distance from the image point to the transmitter wherein the resulting combined distances represents the round trip travel distances from each receiver to the image point to the transmitter;
   b) means for using the round trip travel distances to simultaneously select echo samples to be combined whereby the image point is reconstructed.

17. The device according to claim 8 wherein there is included a parallel, pipelined means for combining echo samples to reconstruct the image points, said means having as input the image point coordinates, $(x_p,y_p,z_p)$, comprising:
   a) plural parallel means for computing simultaneously the distances from the receivers to the image point comprising:
      aa) means for computing simultaneously first distances from the receivers to $(x_p,y_p)$ or $(x_p,z_p)$ or $(y_p,z_p)$;
      bb) means for using said first distances to compute the final distances to $(x_p,y_p,z_p)$;
      cc) means for simultaneously combining the distances from the receivers with the distance from the image point to the transmitter wherein the resulting combined distances represents the round trip travel distances from each receiver to the image point to the transmitter;
   b) means for using the round trip travel distances to simultaneously select echo samples to be combined whereby the image point is reconstructed.

18. The device according to claim 17 further comprising a means for generating tomographic images within the imaged three dimensional volume, said means comprising:

a) Means for using the equation of a plane to select three dimensional voxels which will be used in the tomogram;
b) Means for generating addresses for the tomogram pixels using the voxel coordinates and the coefficients of the equation of the plane;
c) Means for generating write pulses for the pixels by comparing the two sides of the equation.

19. The device according to claim 18 further comprising a means for generating shadowgraph images of the imaged three dimensional volume, said means comprising;
a) Means for using the equations of lines to generate addresses of the voxels to be summed to create pixels for the shadowgraph
b) Means for generating a sequence of pixel addresses for the shadowgraph and summing them with the reconstruction point coordinates to create one side of the equation
c) Means for multiplying the coefficients of the equation with a vector incrementor parameter and summing the results to generate the other side of the equation
d) Means for comparing the two sides of the equation to generate write pulses for the shadowgraph memory.

20. The device according to claim 19 wherein the transmitted pulse is a wideband pulse.

21. The device according to claim 2 wherein the transmitted pulse is a wideband pulse.

22. The device according to claim 1 wherein the transmitted pulse is a monopolar pulse.

23. The device according to claim 2 wherein the transmitted pulse is a monopolar pulse.

24. The device according to claim 2 wherein the transmitted pulse is a pulse of particles.

25. The device according to claim 24 wherein the echo energy is electromagnetic energy and the different velocities of the transmitted pulse and the echoes are used in the image reconstruction wherein the back-projected ellipsoids are distorted.

* * * * *